US009421863B2

(12) United States Patent
Ruokola

(10) Patent No.: US 9,421,863 B2
(45) Date of Patent: Aug. 23, 2016

(54) MULTI-RATIO POWER TAKEOFF DRIVE FOR AGRICULTURAL TRACTOR

(71) Applicant: VALTRA OY AB, Hesston, KS (US)

(72) Inventor: Timo Ruokola, Suolahti (FI)

(73) Assignee: VALTRA OY AB, Soulahti (FI)

( * ) Notice: Subject to any disclaimer, the term of this patent is extended or adjusted under 35 U.S.C. 154(b) by 0 days.

(21) Appl. No.: 14/438,747

(22) PCT Filed: Nov. 13, 2013

(86) PCT No.: PCT/EP2013/073698
§ 371 (c)(1),
(2) Date: Apr. 27, 2015

(87) PCT Pub. No.: WO2014/079746
PCT Pub. Date: May 30, 2014

(65) Prior Publication Data
US 2015/0251537 A1    Sep. 10, 2015

(30) Foreign Application Priority Data

Nov. 23, 2012 (GB) .................................. 1221073.8

(51) Int. Cl.
*B60K 25/02* (2006.01)
*B60K 17/28* (2006.01)
(Continued)

(52) U.S. Cl.
CPC ............... *B60K 25/02* (2013.01); *B60K 17/28* (2013.01); *F16H 3/089* (2013.01); *F16H 61/30* (2013.01); *B60K 2025/024* (2013.01); *F16H 2200/0039* (2013.01)

(58) Field of Classification Search
CPC B60K 25/02; B60K 17/28; B60K 2025/024; F16H 61/30; F16H 3/089; F16H 2200/0039
See application file for complete search history.

(56) References Cited

U.S. PATENT DOCUMENTS 3,041,884 A * 7/1962 Elfes ...................... B60K 17/28
192/20
4,287,778 A    9/1981 Quick
(Continued)

FOREIGN PATENT DOCUMENTS

EP       0816715 A    1/1998

OTHER PUBLICATIONS

Intellectual Property Office, International Search Report for Application No. GB1221073.8 (Claims 1-10), dated Mar. 18, 2013.
(Continued)

*Primary Examiner* — Darlene P Condra

(57) ABSTRACT

A multi-ratio PTO drive system is provided and having a first shaft drivingly coupled to a second shaft between an engine output and a splined PTO output stub by a plurality of selectable gear sets. Each gear set delivers a different input-to-output drive ratio and comprises at least a pair of gears drivingly coupled to one another. A first gear of each gear set is keyed on the first shaft and a second gear is selectively engageable with the second shaft by a respective selector mechanism. Each selector mechanism is hydraulically activated by pressurized fluid conveyed through respective fluid conveyance bores in the second shaft. The selector mechanisms may comprise respective coupling gears that are slidable on the second shaft between non-engaged and engaged positions. The coupling gears may serve as pistons within a chamber that can be pressurized wherein the pressurized fluid acts thereupon.

8 Claims, 6 Drawing Sheets

(51) Int. Cl.
*F16H 3/089* (2006.01)
*F16H 61/30* (2006.01)

(56) References Cited

U.S. PATENT DOCUMENTS 5,658,087 A * 8/1997 Butkovich ............ B60K 17/28
 403/2
6,003,391 A * 12/1999 Kojima ................ B60K 17/28
 180/53.1
6,199,653 B1 * 3/2001 Matsufuji ............. B60K 17/35
 180/233
6,401,848 B1 6/2002 Vu
2011/0232979 A1 * 9/2011 Schulz .................. B60K 17/28
 180/53.6

OTHER PUBLICATIONS

European Receiving Office, International Search Report for International Patent Application No. PCT/EP2013/073698, mail date Jan. 30, 2014.

* cited by examiner

MULTI-RATIO POWER TAKEOFF DRIVE FOR AGRICULTURAL TRACTOR

BACKGROUND OF THE INVENTION

1. Field of Invention

The invention relates to agricultural tractors and particularly to multi ratio power take-off (PTO) drive systems fitted thereto.

2. Description of Related Art

Agricultural tractors have for many decades included PTO systems which comprise a splined PTO stub to which an implement drive shaft is attached and from which the implement can derive torque. Example implements which typically require a PTO drive include balers, power harrows and sprayers. A direct mechanical connection normally exists between the tractor engine and the PTO stub with a clutch typically provided to selectively engage the PTO output.

Today, the majority of tractor mounted implements operate at the original ISO 500 industry standard PTO speed of 540 rpm. A PTO stub meeting this standard has 6 splines. Some implements, however, are more power hungry than others and more recently have been designed to operate at a faster industry standard of 1000 rpm thus providing greater efficiency. A PTO stub meeting the standard for this faster speed has 20 splines.

To cater for different implements having different operating requirements, modern tractors are fitted with multi-ratio PTO drive systems which offer PTO output speeds of 540 rpm and 1000 rpm at the rated engine speed of the tractor. The different design of PTO stubs for the different operating speeds is intended to safeguard against inadvertent attachment of an implement designed to operate at 540 rpm to a tractor set up to deliver 1000 rpm.

Further to providing 540 rpm and 1000 rpm at the rated engine speed, further ratios are provided in some cases to give 540 rpm and/or 1000 rpm at a lower engine speed, commonly referred to a 540E mode and a 1000E mode respectively, 'E' representing economy.

Despite this difference in PTO stub design, there is still a reliance upon the operator to activate the correct PTO output speed for the implement attached thus leaving open the risk of incorrect speed ratio selection and resulting damage to the PTO drive system and/or implement.

Known multi-ratio PTO drive systems include a mechanical selector mechanism connected to a lever in the driver's cab from where the operator can select the required drive ratio. Such a mechanism is deemed cumbersome and requires space in the cab to accommodate the lever. Furthermore, the linkages involved are susceptible to wear and failure.

OVERVIEW OF THE INVENTION

It is thus an object of the invention to provide a multi-ratio PTO drive system with improved durability.

It is a further object of the invention to provide a multi-ratio PTO drive system which is easier to operate.

In accordance with the invention there is provided an agricultural tractor comprising a multi-ratio PTO drive system having a first shaft drivingly coupled to a second shaft between an engine output and a PTO output stub by a plurality of selectable gear sets, each gear set delivering a different input-to-output drive ratio and comprising a first gear keyed on the first shaft and a second gear selectively engageable with the second shaft by a respective selector mechanism arranged to be hydraulically activated by pressurised fluid conveyed through respective fluid conveyance bores in the second shaft.

By providing fluid conveyance bores in the shaft which supports the engageable gears, the ratio selector mechanisms can be hydraulically controlled thus dispensing with the need for mechanical linkages and levers in the cab. In conjunction with suitable hydraulic control systems the PTO drive system provided is thus more durable and easier to operate.

The PTO drive system preferably includes means to supply pressurised fluid to the respective fluid conveyance bores whilst permitting the second shaft to rotate. For example, one end of the second shaft may be provided with a plurality of circumferential grooves which are sealed inside a supporting hub and wherein each groove is in communication (by radial channels) with a respective one of said fluid conveyance bores so that hydraulic fluid can be supplied thereto through holes in the hub aligned with the respective grooves.

In a preferred arrangement the tractor further comprises a releasable locking mechanism to secure the PTO stub in a socket provided in one end of the second shaft, the PTO drive system further comprising a spool valve embedded in the second shaft and comprising a piston element which is slidable in a valve bore that extends generally axially into the second shaft from a base of said socket, the piston element being slidable between a first position in which the piston element protrudes into the socket and a second position in which the piston blocks one of said fluid conveyance bores to prevent activation of the selector mechanism associated therewith. By providing a spool valve in this manner, the engagement of the lower speed (540 rpm) PTO stub can automatically prevent selection of a higher drive speed by blocking the associated fluid conveyance bore residing in the second shaft. This presents significant improvements in the safety of multi-ratio PTO drive systems and demands that the correct PTO stub is fitted before the higher drive speeds can be activated.

In a preferred arrangement the PTO stubs are interchangeable wherein the splined stub associated with the higher drive speed (1000 RPM) is provided with a recess in the base to avoid displacement of the spool valve when the stub is inserted into position and thus permitting activation of the higher drive ratio. In contrast, the PTO stub associated with the lower drive speed (540 RPM) has a flat base and so, when inserted into the socket, presses the piston element of the spool valve into the blocking position to prevent inadvertent activation of the higher drive ratio.

Biasing means (such as a coil spring) are preferably provided to bias the piston element into the first, non-blocking, position.

In a preferred construction, each selector mechanism comprises an annular coupling gear which is moveable between a first non-engaged position and a second engaged position, the coupling gear comprising teeth on both an inner and outer circumferential edge, when in the engaged position the teeth on the inner circumferential edge mesh with splines on the second shaft and the teeth on the outer circumferential edge mesh with an inside gear formed in a hub of the associated said second gear. Biasing means (such as a plurality of coil springs) may be provided to bias the coupling gear into the non-engaged position. The coupling gear itself may serve as a piston which is displaceable into the engaged position by pressurised fluid conveyed via the fluid conveyance bores in the second shaft.

The PTO drive system may comprise two, three or more selectable gear sets, each providing a different input-to-output drive ratio and thus operating drive speed. One or more spool valves may be provided in the second shaft to block one or more of the fluid conveyance bores. For example, a third PTO stub construction may be provided for which has a recess in the base of an intermediate depth which displaces one of the spool valves but not a second.

BRIEF DESCRIPTION OF THE DRAWINGS

Further advantages of the invention will become apparent from reading the following description of specific embodiments with reference to the appended drawings in which:—

DETAILED DESCRIPTION OF THE INVENTION

Figure 1:
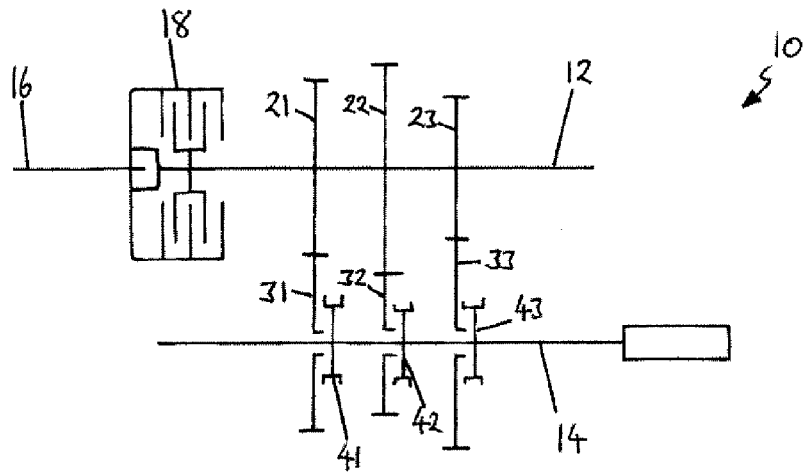
FIG. 1 is a schematic diagram of a multi-ratio PTO drive system in accordance with a first embodiment of the invention.

The PTO drive system to be described below will be understood as being fitted to an agricultural tractor. The construction shown in the drawings is a PTO drive system fitted to the rear of an agricultural tractor. However it should be understood that a multi-ratio PTO drive system in accordance with the invention, or indeed with the construction described below, can be fitted instead to the front of an agricultural tractor.

The terms front and rear used hereinafter are made in relation to the front and rear of the tractor to which the PTO system is fitted. To be clear, the front of the construction is to the left of all figures with the rear of the construction to the right.

Figure 2:
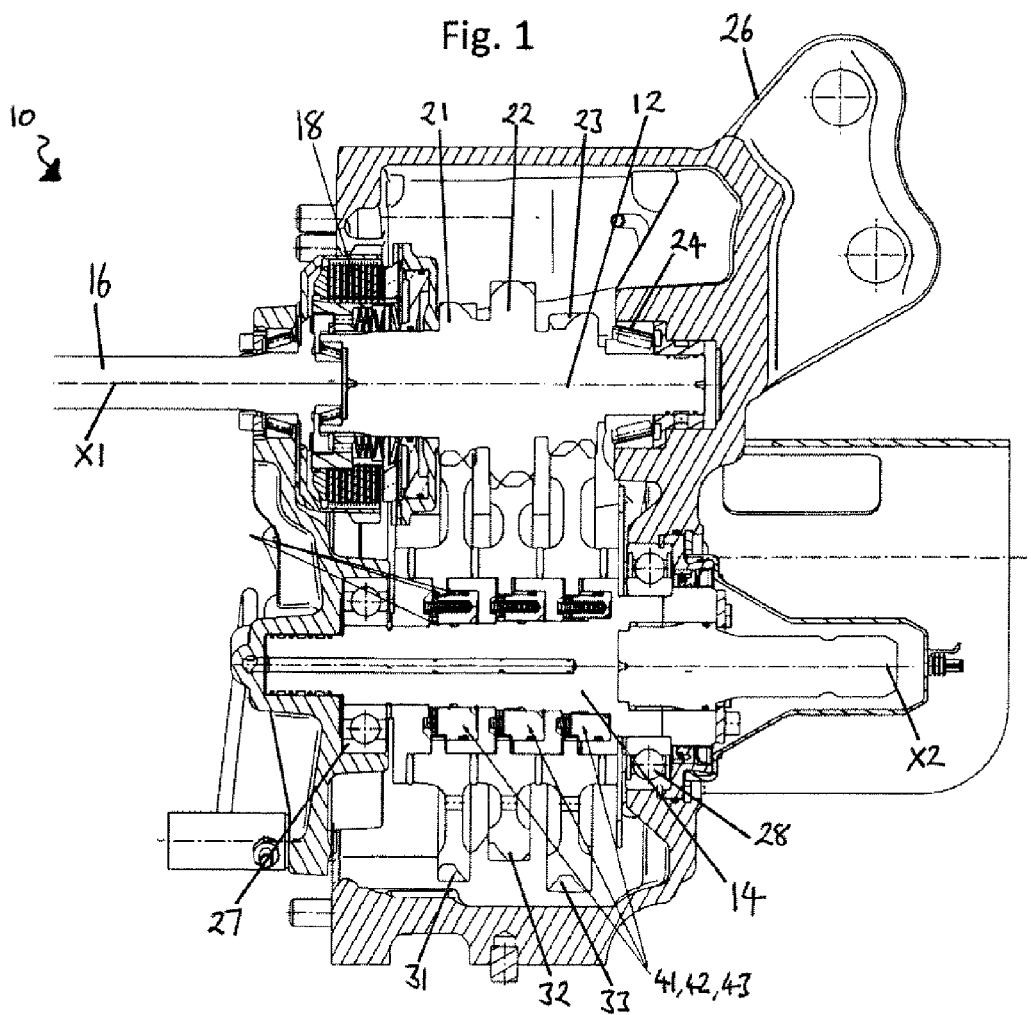
FIG. 2 shows a vertical section through a multi-ratio PTO drive system in accordance with the first embodiment of the invention.

With reference to FIGS. 1 and 2, a multi-ratio PTO drive system 10 comprises a first shaft 12 and a second shaft 14 located below and parallel to the first shaft 12. As in known PTO drive systems, the first shaft 12 is drivingly coupled to an engine driveshaft 16 via a selectively engageable multi-plate PTO clutch 18. The PTO drive system 10 derives torque from the engine and its output driveshaft 16.

Keyed onto the first shaft 12 are three gears 21, 22, 23 of varying diameters. First shaft 12 is supported for rotation on axis X1 at one end by the PTO clutch 18 and at the other, rear, end by a bearing 24 which is held in a recess or hub formed in housing 26.

Second shaft 14 is supported for rotation on axis X2 by a forward bearing 27 and rear bearing 28 which are held in respective recesses in housing 26. The construction of second shaft 14 and the associated components is shown in more detail in FIG. 3. Gears 31, 32, 33 are mounted for rotation on second shaft 14 around axis X2.

A first collar 34 is provided between the first gear 31 and second gear 32. Similarly, a second collar 35 is provided between the second gear 32 and third gear 33. The collars 34, 35 are a tight fit on the shaft 14 and serve as hydraulic cylinders to be described below.

The plain outer peripheral surface of each collar 34, 35 contacts plain inner rims of the adjacent pairs of gears. Therefore, the first collar 34 supports the first gear 31 and second gear 32. The second collar supports the second gear 32 and third gear 33. The plain contacting surfaces allows the gears 31, 32, 33 to rotate with respect to the collars 34, 35.

A rear collar 36 is integral with the second shaft 14 and comprises a plain outer peripheral surface which supports the rear side of the third gear 33 with plain contacting surfaces allowing rotation therebetween. Likewise, a flange 37 supports the front side of first gear 31 and serves as a spacer between the first gear 31 and forward bearing 27. Rear collar 36 also serves as a hydraulic cylinder to be described below.

Gear 21 and 31 permanently mesh with one another to form a first gear set associated with a first input-to-output drive ratio. Gears 22 and 32 permanently mesh with one another to provide a second gear set associated with a second input-to-output drive ratio. Gears 23 and 33 permanently mesh with one another to form a third gear set associated with a third input-to-output drive ratio.

Selector Mechanism

Each of gears 31, 32, 33 form a second gear in one of the aforementioned gear sets and are each selectively engageable with the second shaft 14 by a respective hydraulically-activated selector (or coupling) mechanism to be described hereinafter.

Each of the three selector mechanisms comprise an annular coupling gear 41, 42, 43 which is mounted on second shaft 14. Each annular coupling gear 41, 42, 43 is moveable along the second shaft 14 between a first non-engaged position and a second engaged position, the movement limits being defined between adjacent pairs of collars.

Figure 3:
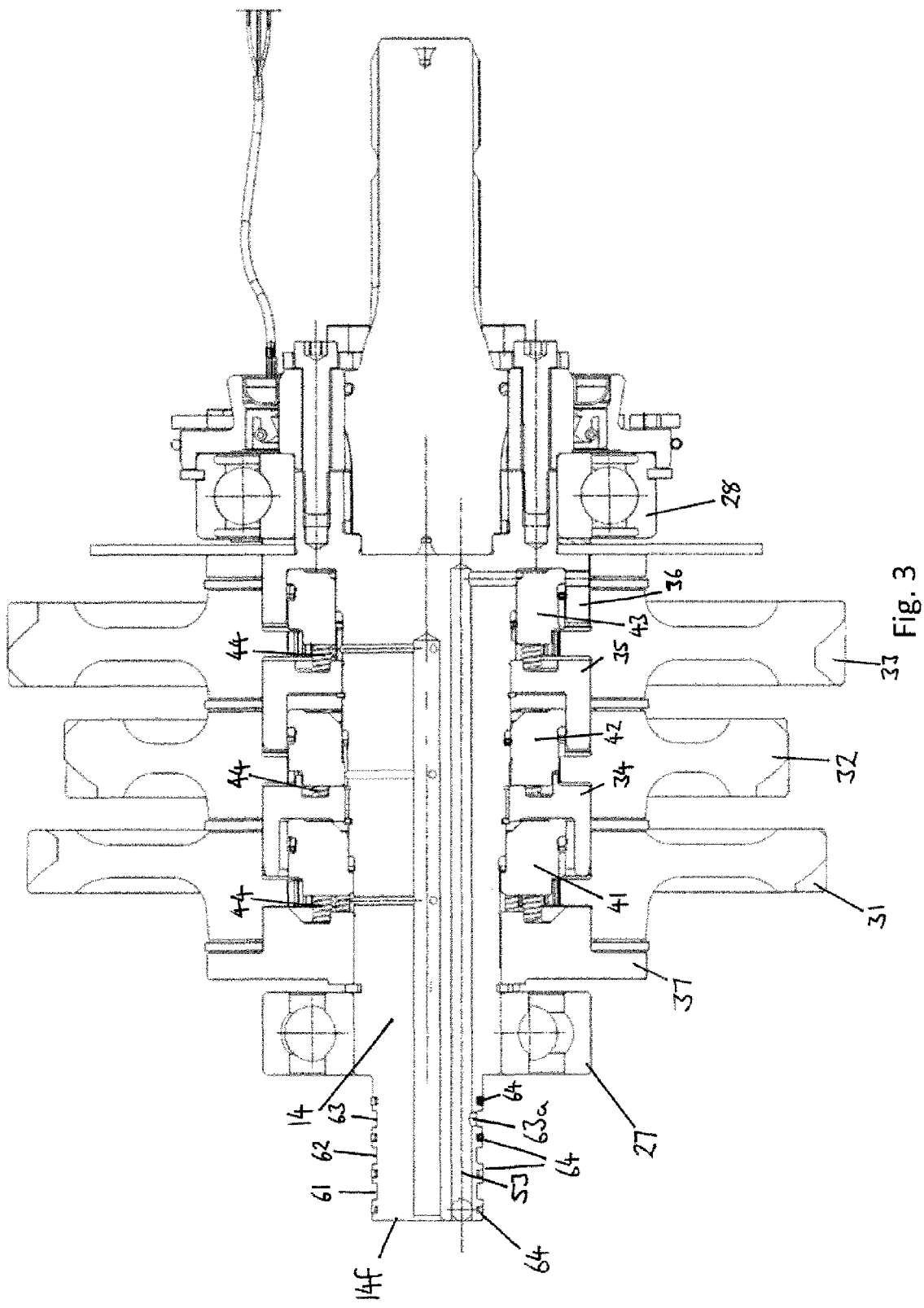
FIG. 3 shows a vertical section through part of the PTO drive system of FIG. 2 showing the second shaft and PTO stub in detail.

With particular reference to FIG. 3, the first coupling gear 41 resides in an annular recess defined in the front side of first collar 34. Coil springs 44 in compression between the rear side of flange 37 and the front side of first coupling gear 41 bias that couple gear 41 into the non-engaged position (to the right as viewed in FIG. 3).

The second coupling gear 42 resides in an annular recess defined in the front side of second collar 35. Similarly, coil springs are provided between the rear side of first collar 34 and the front side of second coupling gear 42. It should be appreciated that FIG. 3 shows the second coupling gear in the engaged position (displaced to the left). The third coupling gear 43 resides in an annular recess defined in the front side of end collar 36. Coil springs are provided between the rear side of second collar 35 and the front side of third coupling gear 43.

Each of the annular recesses formed in the front of collars 34, 35, 36 serve as cylinders for individual hydraulic actuators wherein the associated coupling gear 41, 42, 43 provides a displaceable piston therein. The coupling gears 41, 42, 43 can each be pushed into the engaged position by the application of pressurised fluid conveyed via respective bores 51, 52, 53 formed parallel to one another inside the second shaft 14.

Pressurised hydraulic fluid is passed to the conveyance bores 51, 52, 53 by a respective rotation seal provided at the forward end 14f of second shaft 14. In more detail, a first circumferential groove (or channel) 61 is provided at the forward-most end of second shaft 14 with a hole (not shown) connecting the groove 61 to the first longitudinal bore 51. A second groove 62 spaced rearward of the first groove 61 includes a hole (not shown) connecting the groove 62 to the second longitudinal bore 52. Similarly, a third circumferential groove 63 is provided rearward of the first and second grooves 61, 62 and a hole 63a (visible in FIG. 3) connects the third groove 63 with the third longitudinal bore 53.

Sealing rings 64 are provided between the grooves 61, 62, 63 to ensure a sufficient seal inside the housing 26 which provides a front supporting hub for the second shaft 14. Pressurised fluid is delivered to the respective grooves 61, 62, 63 via dedicated channels provided in the housing 26 which are aligned with the associated grooves 61, 62, 63.

The application of pressurised fluid via the longitudinal bores 51, 52, 53 thereby forces the coupling gears 41, 42, 43 into the engaged position.

Figure 6:
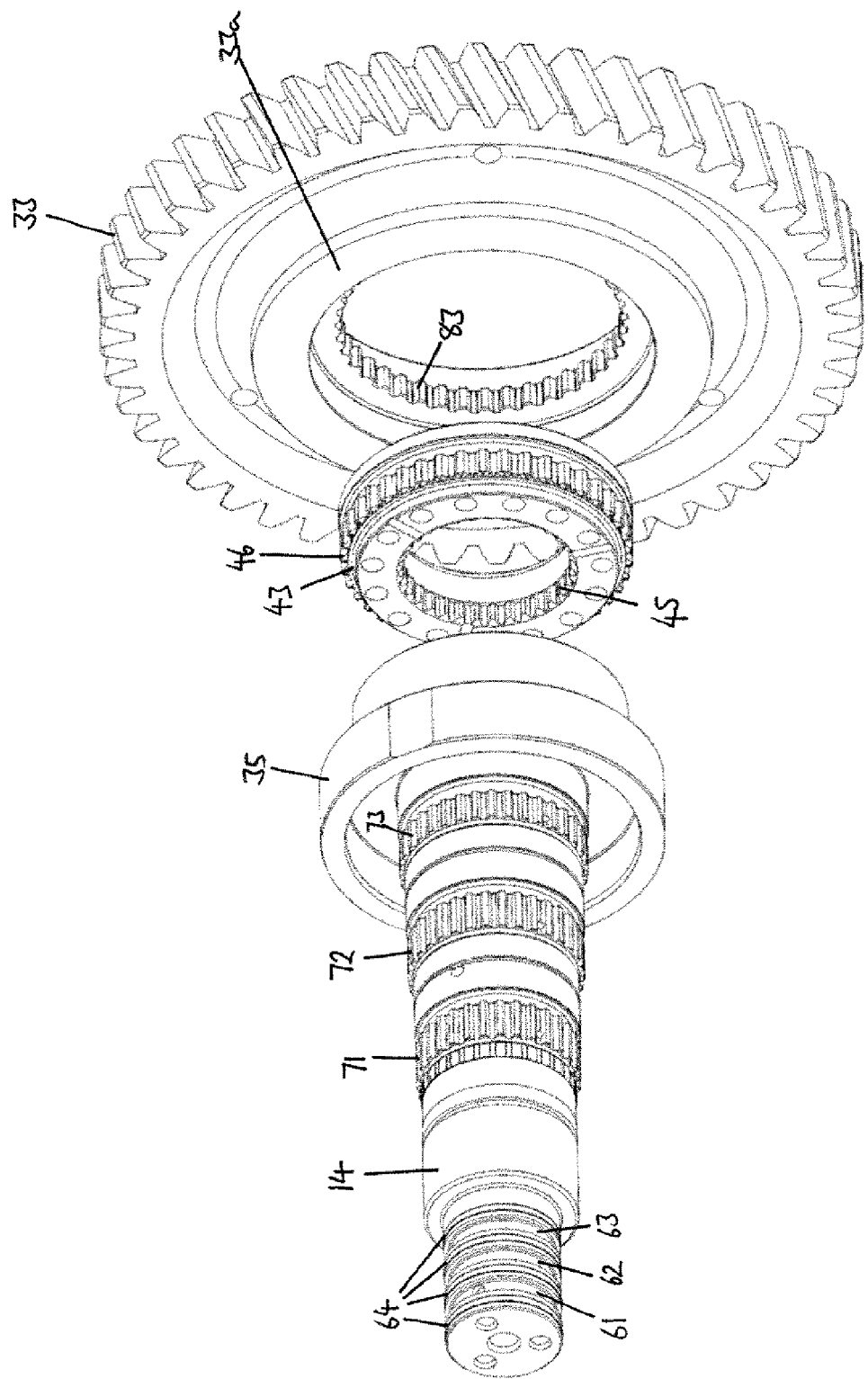
FIG. 6 is an exploded view of the second shaft of FIG. 4 showing one ratio selector mechanism.

Turning to FIG. 6, the second shaft 14 is provided with three sets of splines 71, 72, 73. When slid into the engaged position, teeth 45 provided on the inner circumferential edge of the coupling gears 41, 42, 43 mesh with a respective set of said splines 71, 72, 73. FIG. 6 shows only the third coupling gear 43 and second collar 35, wherein the teeth 45 on the inner circumferential edge of the coupling gear 43 mesh with the splines 73 when in the engaged position.

Moreover, teeth 46 provided on the outer circumferential edge of coupling gear 43 mesh with an inside gear 83 formed in the hub 33a of gear 33. Therefore, when in the engaged position, coupling gear 43 mechanically couples gear 33 with the second shaft 14. This equates to engagement of the third gear set and thus the third input-to-output ratio.

With reference again to FIG. 3, the second coupling gear 42 is shown in the engaged position wherein pressurised fluid conveyed through bore 52 has forced the coupling gear 42 against the coil springs 44 into the engaged position, in this case the second input-to-output ratio is operational, Although the exact input-to-output ratio can be tailored by appropriate selection of the gear sizes, in a preferred arrangement the second gear set delivers a PTO output speed of 1000 rpm at the rated engine speed in accordance with industry standard ISO 500. The third gear set provided by gears 23, 33 provides a PTO output speed of 540 rpm in accordance with the same industry standard. The first gear set provided by gears 21, 31 provides an intermediate output ratio of, say, 750 rpm at the rated engine speed. However, this third ratio serves to provide a 540E mode wherein the output speed is 540 rpm at a lower engine speed for fuel economy.

Safety Interlock Mechanism

Figure 4:
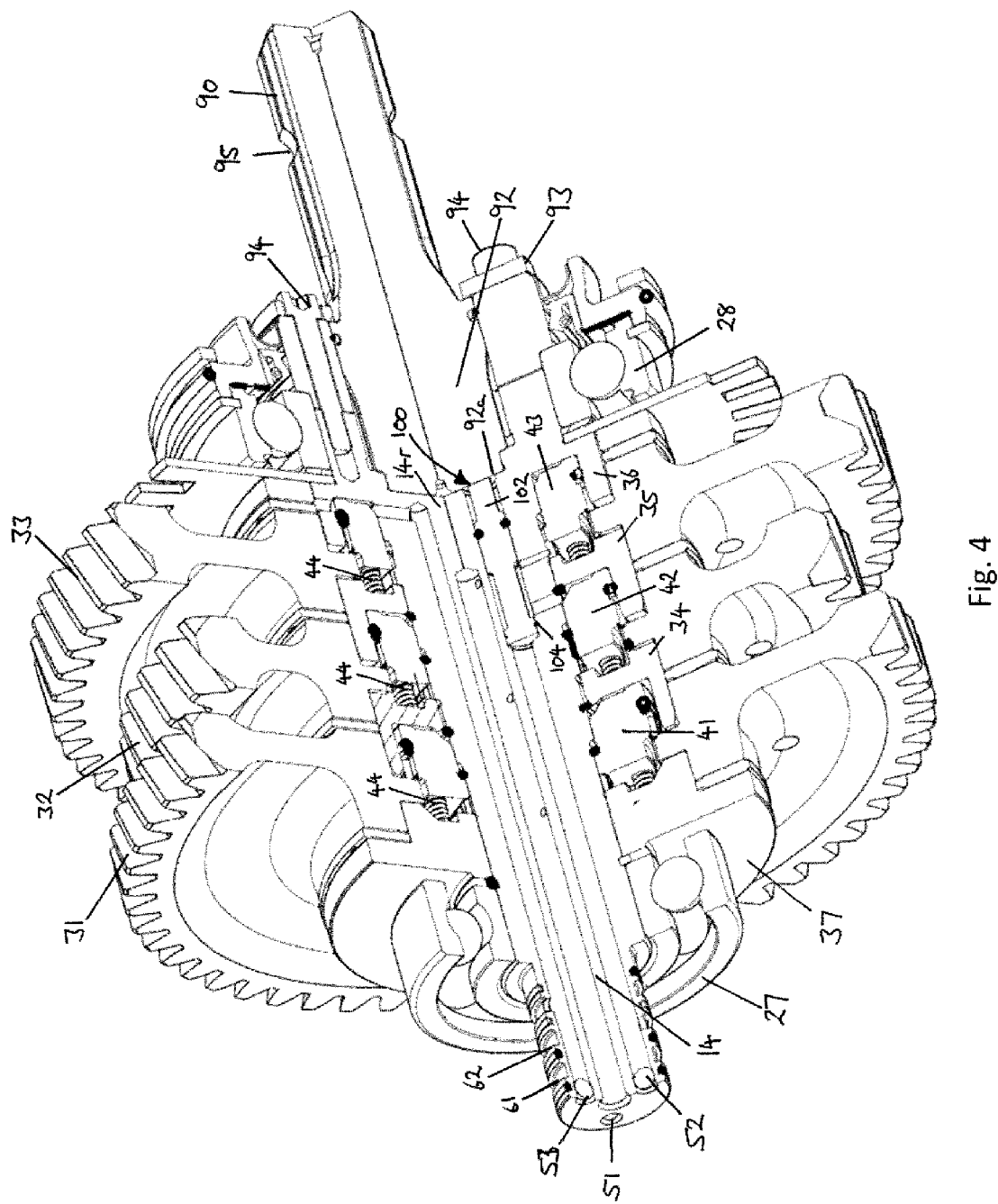
FIGS. 4 and 5 show perspective views of the second shaft of FIG. 3 with a portion cut-away to illustrate some internal components and shown with the PTO stub designed for lower and higher speed working respectively.

As shown in FIG. 4, conventional PTO stub 90 is locked into a receiving socket 92 formed in the rearmost end 14r of second shaft 14. An annular locking plate 93 is secured to the transmission casing by bolts 94. The locking ring 93 overlaps a shoulder of the PTO stub 90 thus securing it in position in a known manner.

PTO stub 90 comprises six splines in conformity with implements intended to operate at a maximum PTO speed of 540 RPM. A notch 95 is provided in the stub 90 with which a locking pin provided on the implement PTO shaft coupling engages.

Figure 5:
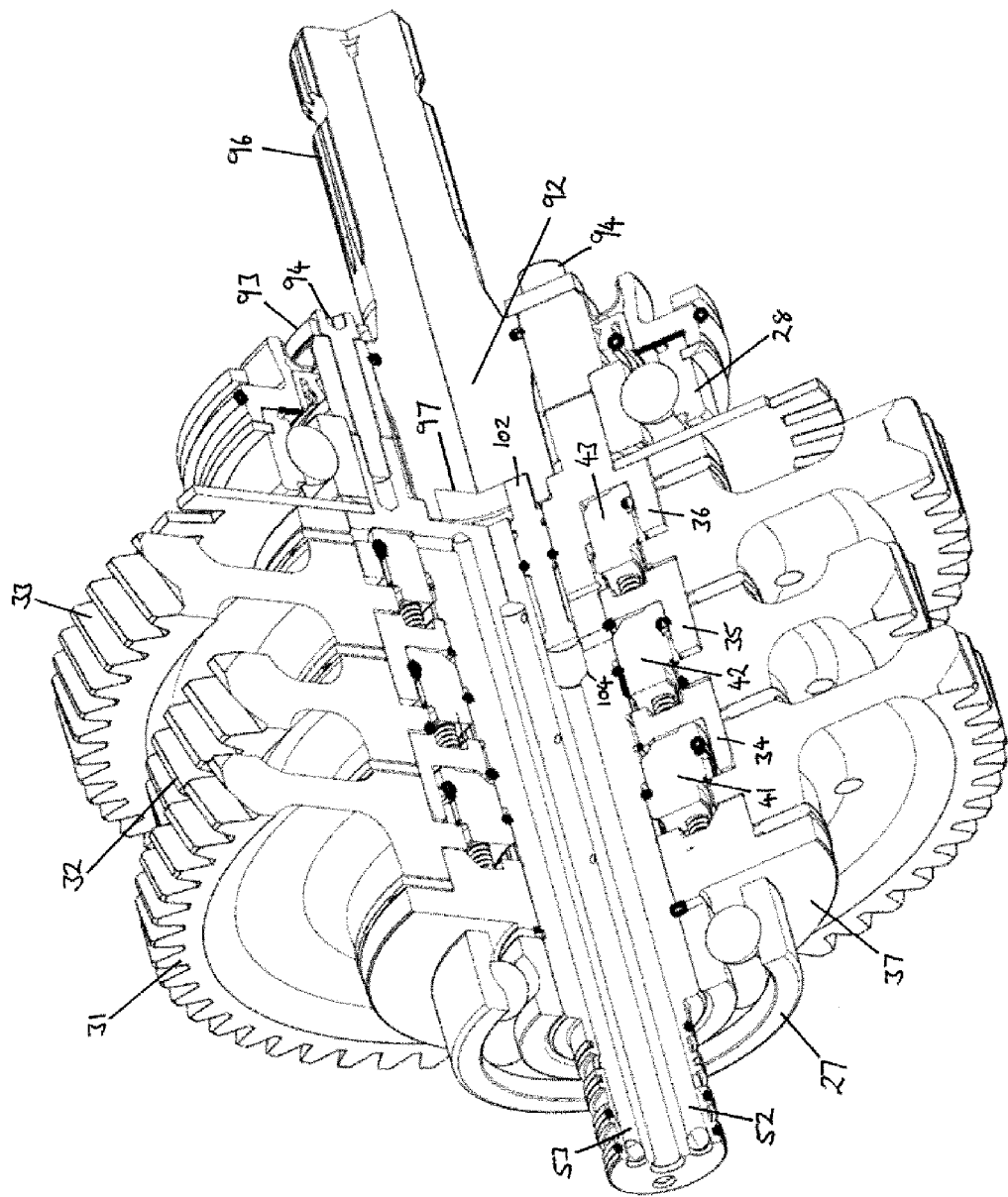

A spool valve designated generally at 100 is embedded in the second shaft 14 in the base of socket 92. Spool valve 100 includes a piston element 102 which is slidable in a valve bore 104 that extends axially into the second shaft 14 from the base 92a of socket 92. FIG. 5 shows the piston element 102 in a first position in which the piston element 102 protrudes into the socket 92. FIG. 4 shows the piston element 102 in a second position in which the piston 102 blocks the second fluid conveyance bore 52. For this to occur, it should be understood that the valve bore 104 is axially aligned with second fluid conveyance bore 52.

As should be understood from the figures, low speed PTO shaft 90 includes a base having a flat profile. Thus when locked in place, PTO stub 90 displaces the piston element 102 into the valve bore 104. Advantageously, this provides an automatic safety feature wherein selection of the (higher speed) second output gear ratio is impossible because pressurised fluid cannot reach the second coupling gear 42.

With reference to FIG. 5, a second PTO stub 96 is provided with 20 splines in conformity with industry standard for implements designed to operate at 1000 RPM. High speed PTO stub 96 includes a recess 97 formed in the base thereof. When locked into the socket 92 the recess 97 receives the protruding part of spool valve piston 102. Therefore, spool valve piston 102 is not displaced inwardly and so the fluid conveyance path provided by longitudinal bore 52 is not blocked. This allows activation of the second PTO ratio and thus the higher speed 1000 RPM drive output.

In arrangement not shown in the drawings, it is envisaged that a third design of PTO stub may be employed which includes a recess in the base having an intermediate depth which activates a first spool valve of the kind described but not a second spool valve. In this case the higher-most output ratio of the three available is blocked whereas the remaining two remain available for the operator to select.

In an alternative embodiment of the invention not illustrated, one gear from each gear set is keyed to the second shaft, that is the one aligned with the PTO stub, and the other gear from each gear set is selectively engageable with the first shaft, that is the shaft coupled directed to the PTO clutch. In this case, the fluid conveyance bores may be provided from the rear-most end of the first shaft.

Figure 7:
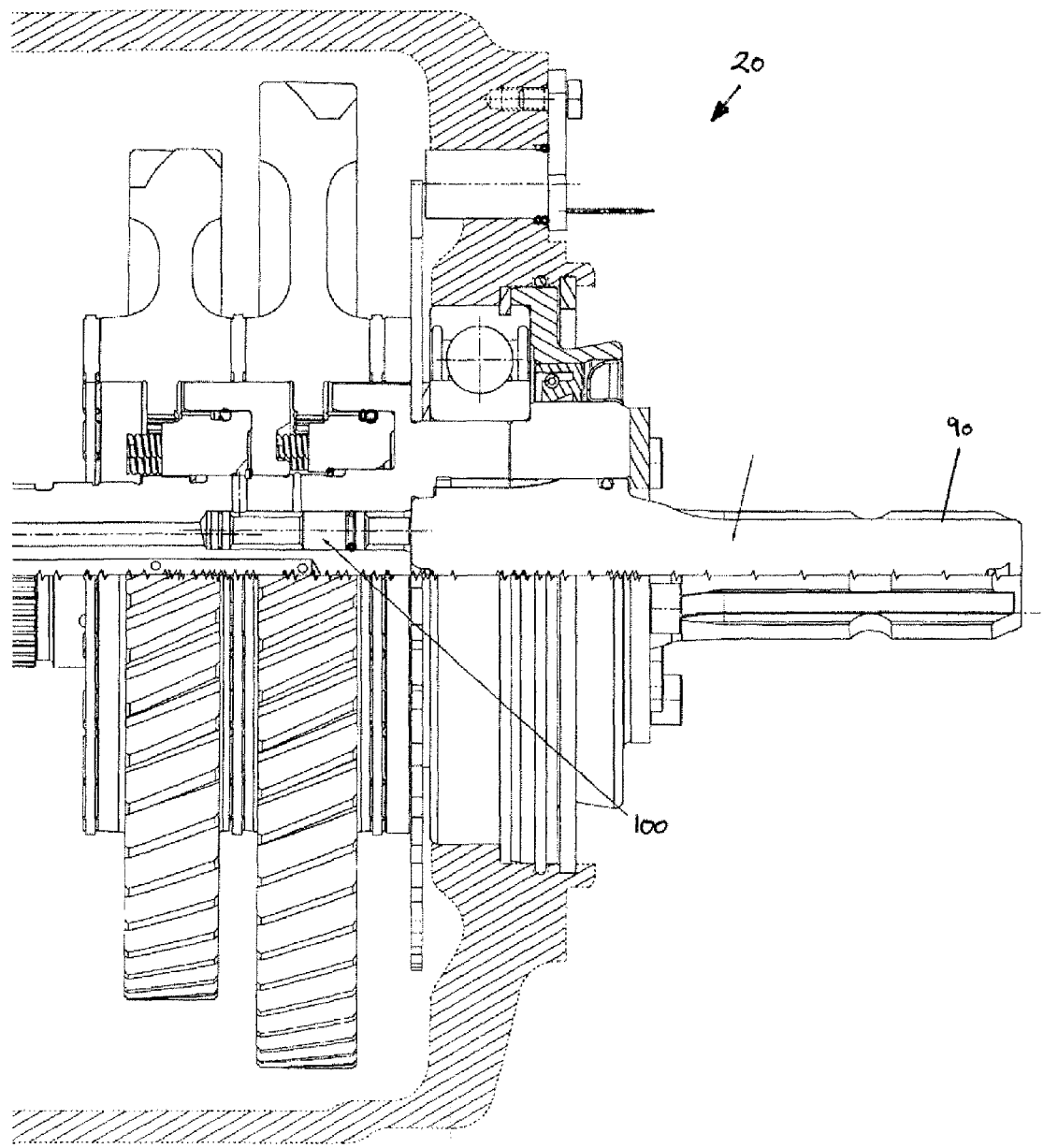
FIG. 7 is a part cut-away vertical section through part of a multi-ratio PTO drive system in accordance with a second embodiment of the invention.

A second illustrated embodiment is shown in FIG. 7 in which a second multi-ratio PTO drive system 20 includes only two output ratios, providing a working output speed of 540 RPM and 1000 RPM respectively. As in the previous described embodiment, a spool valve 100 is provided which is displaced inwardly by the low speed PTO stub 90 thus blocking selection of the higher speed output ratio. It should be understood that the first gear from each gear set, and the first shaft upon which the first gears are mounted, are not shown in FIG. 7.

In summary, there is provided an agricultural tractor comprising a multi-ratio PTO drive system having a first shaft drivingly coupled to a second shaft between an engine output and a splined PTO output stub by a plurality of selectable gear sets. Each gear set delivers a different input-to-output drive ratio and comprises at least a pair of gears drivingly coupled to one another. A first gear of each gear set is keyed on the first shaft and a second gear is selectively engageable with the second shaft by a respective selector mechanism. Each selector mechanism is hydraulically activated by pressurised fluid conveyed through respective fluid conveyance bores in the second shaft. The selector mechanisms may comprise respective coupling gears that are slidable on the second shaft between non-engaged and engaged positions. The coupling gears may serve as pistons within a chamber that can be pressurised wherein the pressurised fluid acts thereupon.

The invention claimed is:

1. An agricultural tractor having a multi-ratio PTO drive system comprising:
   a first shaft drivingly coupled to a second shaft between an engine output and a PTO output stub by a plurality of selectable gear sets, each gear set delivering a different input-to-output drive ratio and comprising a first gear keyed on the first shaft and a second gear selectively engageable with the second shaft by a respective selector mechanism arranged to be hydraulically activated by pressurised fluid conveyed through respective fluid conveyance bores in the second shaft;

a releasable locking mechanism to secure the PTO stub in a socket provided in one end of the second shaft; and a spool valve embedded in the second shaft and comprising a piston element which is slidable in a valve bore that extends generally axially into the second shaft from a base of said socket, the piston element being slidable between a first position in which the piston element protrudes into the socket and a second position in which the piston blocks one of said fluid conveyance bores to prevent activation of the selector mechanism associated therewith, wherein the valve bore is aligned axially with respect to the second shaft along an axis that is offset from the rotation axis of the second shaft.

2. The agricultural tractor according to claim 1, wherein a first one of said plurality of gear sets delivers, for a given input speed, a lower output speed than a second one of said plurality of gear sets, and wherein the piston element blocks the fluid conveyance bore associated with the second gear set.

3. The agricultural tractor according to claim 1, wherein the spool valve comprises biasing means to bias the piston element into the first position.

4. The agricultural tractor according to claim 1, wherein the PTO drive system comprises two interchangeable PTO stubs each having a different number of splines, wherein a first of said PTO stubs has a base with a profile which forces said piston element into its second position when fitted in the socket, and wherein a second of said PTO stubs has a base with a recess which receives the protruding end of the piston element when fitted in the socket.

5. The agricultural tractor according to claim 1, wherein each selector mechanism comprises an annular coupling gear which is moveable between a first non-engaged position and a second engaged position, the coupling gear comprising teeth on both an inner and outer circumferential edges, when in the engaged position the teeth on the inner circumferential edge mesh with splines on the second shaft and the teeth on the outer circumferential edge mesh with an inside gear formed in a hub of the associated said second gear.

6. The agricultural tractor according to claim 5, wherein each selector mechanism comprises biasing means to bias the coupling gear into the non-engaged position.

7. The agricultural tractor according to claim 5, wherein each coupling gear serves as a piston which is displaceable into the engaged position by pressurised fluid conveyed by the fluid conveyance bores.

8. The agricultural tractor according to claim 1, wherein the PTO drive system comprises three selectable gear sets.

* * * * *